US012809540B2

(12) United States Patent
jensen et al.

(10) Patent No.: US 12,809,540 B2
(45) Date of Patent: Nov. 24, 2026

(54) SYSTEMS AND METHODS FOR LIVE MIGRATION WITH ASSIGNED DEVICES

(71) Applicant: Samsung Electronics Co., Ltd., Suwon-si (KR)

(72) Inventors: Klaus Birkelund Abildgaard jensen, Herfølge (DK); Daniel Lee Helmick, Thornton, CO (US)

(73) Assignee: SAMSUNG ELECTRONICS CO., LTD. (KR)

(*) Notice: Subject to any disclaimer, the term of this patent is extended or adjusted under 35 U.S.C. 154(b) by 0 days.

(21) Appl. No.: 19/021,151

(22) Filed: Jan. 14, 2025

(65) Prior Publication Data

US 2026/0044274 A1 Feb. 12, 2026

Related U.S. Application Data

(60) Provisional application No. 63/682,285, filed on Aug. 12, 2024.

(51) Int. Cl.
*G06F 3/06* (2006.01)

(52) U.S. Cl.
CPC .......... *G06F 3/0647* (2013.01); *G06F 3/0604* (2013.01); *G06F 3/0683* (2013.01)

(58) Field of Classification Search
CPC ..... G06F 3/0647; G06F 3/0604; G06F 3/0683
USPC .......................................................... 711/165
See application file for complete search history.

(56) References Cited

U.S. PATENT DOCUMENTS 9,910,780 B2 3/2018 Kapoor
10,013,360 B2 7/2018 Mukherjee
10,481,940 B2 11/2019 Srinivas
10,503,659 B2 12/2019 Tsirkin et al.
11,409,619 B2 8/2022 Gopalan et al.
11,775,329 B1 10/2023 Lunev
11,983,079 B2 5/2024 Gopalan et al.
(Continued)

FOREIGN PATENT DOCUMENTS

CN 105335223 A 2/2016
CN 108932149 B 11/2023

OTHER PUBLICATIONS

Hines, Michael R. et al., "Post-Copy Live Migration of Virtual Machines," ACM SIGOPS Operating Systems Review, vol. 43, No. 3, Jul. 2009, 13 pages.

*Primary Examiner* — Than Nguyen

(74) *Attorney, Agent, or Firm* — Renaissance IP Law Group LLP

(57) ABSTRACT

Provided are systems, methods, and apparatuses for systems and methods for live migration with assigned devices. In one or more examples, the systems, devices, and methods include receiving, at a destination memory, first data from a source; indicating in a mapping table that second data from the source memory is unavailable; sending, to the memory manager, a first message requesting to access on the memory of the destination device one or more memory pages associated with the second data; sending, to a migration manager, a second message requesting the one or more memory pages associated with the second data; receiving, from the memory manager, a third message indicating the one or more memory pages are transferred; and accessing the one or more memory pages on the memory of the destination device.

20 Claims, 8 Drawing Sheets

(56) References Cited

U.S. PATENT DOCUMENTS

| | | | | |
|---|---|---|---|---|
| 2006/0136696 | A1 | 6/2006 | Grayson | |
| 2008/0127182 | A1 | 5/2008 | Newport et al. | |
| 2014/0006681 | A1 | 1/2014 | Chen et al. | |
| 2016/0259732 | A1 | 9/2016 | Mukherjee | |
| 2020/0097323 | A1* | 3/2020 | Nider | G06F 3/067 |
| 2021/0263762 | A1* | 8/2021 | Kachare | G06F 3/0658 |
| 2021/0374094 | A1* | 12/2021 | Danilov | G06F 16/162 |
| 2022/0261170 | A1* | 8/2022 | Vohra | G06F 3/0688 |
| 2022/0382616 | A1* | 12/2022 | Brych | G06F 3/0631 |
| 2023/0023452 | A1* | 1/2023 | Baskakov | G06F 3/0679 |
| 2023/0121646 | A1* | 4/2023 | Veluswamy | G06F 3/067<br>711/154 |
| 2023/0169013 | A1 | 6/2023 | Moon et al. | |

* cited by examiner

600

SYSTEMS AND METHODS FOR LIVE MIGRATION WITH ASSIGNED DEVICES

CROSS-REFERENCE TO RELATED APPLICATIONS

This application claims the benefit of U.S. Provisional Patent Application Ser. No. 63/682,285, filed Aug. 12, 2024, which is incorporated by reference herein for all purposes.

TECHNICAL FIELD

The disclosure relates generally to memory systems. In particular, the subject matter relates to systems and methods for live migration with assigned devices.

BACKGROUND

The present background section is intended to provide context only, and the disclosure of any concept in this section does not constitute an admission that said concept is prior art.

A virtual machine (VM) is a software-based computer that behaves like a physical computer. VMs can be made up of resources from a physical host computer or remote server, and can run programs, store data, connect to networks, and other computing functions. VMs can have their own operating system, storage, networking, configuration settings, and software, and can be fully isolated from other VMs running on that host. VM migration is the process of moving a VM from one physical hardware environment to another. VM migration may be referred to as teleportation. VM migration can be used in virtualization environments to optimize resource utilization, balance workload, and/or reduce downtime for maintenance and upgrades.

SUMMARY

In various embodiments, the systems and methods described herein include systems, methods, and apparatuses for systems and methods for live migration with assigned devices. In some aspects, the techniques described herein relate to a method of live migration including: receiving, at a memory of a destination device, first data from a memory of a source device; indicating in a mapping table of a memory manager that second data from the memory of the source device is unavailable in the memory of the destination device; sending, from a storage drive to the memory manager, a first message requesting to access, on the memory of the destination device, one or more memory pages associated with the second data; sending, from the memory manager to a migration manager of the destination device, a second message requesting the one or more memory pages associated with the second data be copied from the memory of the source device to the memory of the destination device; receiving, at the storage drive from the memory manager, a third message indicating the one or more memory pages are copied from the memory of the source device to the memory of the destination device; and accessing, by the storage drive, the one or more memory pages on the memory of the destination device.

In some aspects, the techniques described herein relate to a method, wherein the storage drive pauses a command associated with the one or more memory pages based on the storage drive receiving an error message from the memory manager indicating the one or more memory pages are unavailable on the memory of the destination device.

In some aspects, the techniques described herein relate to a method, wherein the command includes at least one of a write command, a read command, or an allocation command.

In some aspects, the techniques described herein relate to a method, wherein the migration manager requests, based on the second message, that the one or more memory pages be copied from the memory of the source device to the memory of the destination device.

In some aspects, the techniques described herein relate to a method, wherein the third message is based on the migration manager communicating to the memory manager that the one or more memory pages are copied from the memory of the source device to the memory of the destination device.

In some aspects, the techniques described herein relate to a method, wherein the memory manager updates the mapping table to indicate the one or more memory pages associated with the second data are available on the memory of the destination device.

In some aspects, the techniques described herein relate to a method, wherein the storage drive and the memory manager are located on the destination device.

In some aspects, the techniques described herein relate to a method, wherein: the memory manager is included in a processor of the destination device, and the mapping table is stored in the memory manager.

In some aspects, the techniques described herein relate to a method, wherein the storage drive writes data corresponding to the one or more memory pages to at least one logical block address (LBA) of the storage drive.

In some aspects, the techniques described herein relate to a method of live migration including: receiving, at a destination storage drive of a destination device, first data from a source storage drive of a source device; indicating in a mapping table of the destination storage drive that second data from the source storage drive is unavailable in the destination storage drive; receiving, at the destination storage drive from a host of the destination device, a first message requesting to access on the destination storage drive one or more logical block addresses (LBAs) associated with the second data; sending, from the destination storage drive to a migration manager of the destination device, a second message requesting the one or more LBAs associated with the second data be copied from the source storage drive to the destination storage drive; receiving, at the storage drive from the migration manager, a third message indicating the one or more LBAs are copied from the source storage drive to the destination storage drive; and providing, by the destination storage drive, data associated with the one or more LBAs to the host of the destination device.

In some aspects, the techniques described herein relate to a method, wherein the destination storage drive pauses a command associated with the one or more LBAs based on the mapping table of the storage drive indicating the one or more LBAs are unavailable on the destination storage drive.

In some aspects, the techniques described herein relate to a method, wherein the command includes at least one of a write command, a read command, or an allocation command.

In some aspects, the techniques described herein relate to a method, wherein the migration manager requests, based on the second message, that the one or more LBAs be copied from the source storage drive to the destination storage drive.

In some aspects, the techniques described herein relate to a method, wherein the third message is based on the migration manager communicating to the destination storage drive that the one or more LBAs are copied from the source storage drive to the destination storage drive.

In some aspects, the techniques described herein relate to a method, wherein the destination storage drive updates the mapping table to indicate the one or more LBAs associated with the second data are available on the destination storage drive.

In some aspects, the techniques described herein relate to a method, wherein the mapping table is stored in the destination storage drive.

In some aspects, the techniques described herein relate to a method, wherein the storage drive includes a peripheral component interconnect express (PCIe) solid state drive (SSD) or a non-volatile memory express (NVMe) SSD.

In some aspects, the techniques described herein relate to a non-transitory computer-readable medium storing code that includes instructions executable by one or more processors to: receive first data from memory of a source device; indicate in a mapping table of a memory manager that second data from the memory of the source device is unavailable in a memory of destination device; send, to the memory manager, a first message requesting to access, on the memory of the destination device, one or more memory pages associated with the second data; send, to a migration manager of the destination device, a second message requesting the one or more memory pages associated with the second data be copied from the memory of the source device to the memory of the destination device; receive, from the memory manager, a third message indicating the one or more memory pages are copied from the memory of the source device to the memory of the destination device; and access the one or more memory pages on the memory of the destination device.

In some aspects, the techniques described herein relate to a non-transitory computer-readable medium, wherein the code includes further instructions executable by the processor to pause a command associated with the one or more memory pages based on receiving an error message from the memory manager indicating the one or more memory pages are unavailable on the memory of the destination device.

In some aspects, the techniques described herein relate to a non-transitory computer-readable medium, wherein the command includes at least one of a write command, a read command, or an allocation command.

A computer-readable medium is disclosed. The computer-readable medium can store instructions that, when executed by a computer, cause the computer to perform substantially the same or similar operations as described herein are further disclosed. Similarly, non-transitory computer-readable media, devices, and systems for performing substantially the same or similar operations as described herein are further disclosed.

The systems and methods for live migration with assigned devices described herein include multiple advantages and benefits. For example, the systems and methods can include mechanism to cause specific memory accessed by a device to be accessed and acquired from the Source VM. Based on the systems and methods, a Source state may be retrieved on-demand from the Destination. Based on the systems and methods, irrelevant memory may be identified and the systems and methods may avoid prioritizing the irrelevant memory. Based on the systems and methods described, a time associated with a pause state may be reduced.

BRIEF DESCRIPTION OF THE DRAWINGS

The above-mentioned aspects and other aspects of the present systems and methods will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

Figure 1:
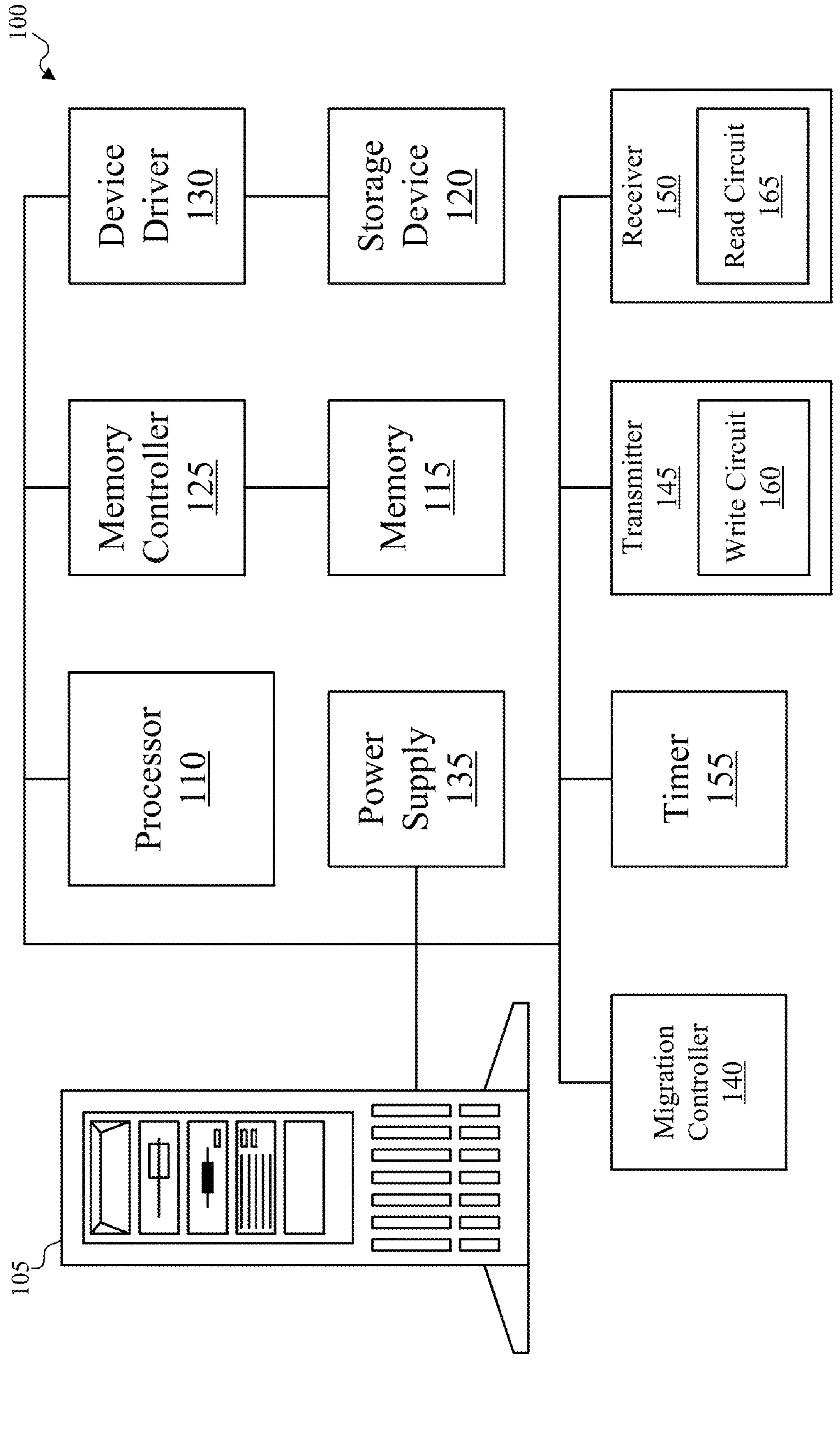
FIG. 1 illustrates an example system in accordance with one or more implementations as described herein.

While the present systems and methods are susceptible to various modifications and alternative forms, specific embodiments thereof are shown by way of example in the drawings and will herein be described. The drawings may not be to scale. It should be understood, however, that the drawings and detailed description thereto are not intended to limit the present systems and methods to the particular form disclosed, but to the contrary, the intention is to cover all modifications, equivalents, and alternatives falling within the spirit and scope of the present systems and methods as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially, such that one instruction is retrieved, loaded, and executed at a time. In some example embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on chip (SoC), an assembly, and so forth.

The following description is presented to enable one of ordinary skill in the art to make and use the subject matter disclosed herein and to incorporate it in the context of particular applications. While the following is directed to specific examples, other and further examples may be devised without departing from the basic scope thereof.

Various modifications, as well as a variety of uses in different applications, will be readily apparent to those skilled in the art, and the general principles defined herein may be applied to a wide range of embodiments. Thus, the subject matter disclosed herein is not intended to be limited to the embodiments presented, but is to be accorded the widest scope consistent with the principles and novel features disclosed herein.

In the description provided, numerous specific details are set forth in order to provide a more thorough understanding of the subject matter disclosed herein. It will, however, be apparent to one skilled in the art that the subject matter disclosed herein may be practiced without necessarily being limited to these specific details. In other instances, well-known structures and devices are shown in block diagram form, rather than in detail, in order to avoid obscuring the subject matter disclosed herein.

All the features disclosed in this specification (e.g., any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Various features are described herein with reference to the figures. It should be noted that the figures are only intended to facilitate the description of the features. The various features described are not intended as an exhaustive description of the subject matter disclosed herein or as a limitation on the scope of the subject matter disclosed herein. Additionally, an illustrated example need not have all the aspects or advantages shown. An aspect or an advantage described in conjunction with a particular example is not necessarily limited to that example and can be practiced in any other examples even if not so illustrated, or if not so explicitly described.

Furthermore, any element in a claim that does not explicitly state "means for" performing a specified function, or "step for" performing a specific function, is not to be interpreted as a "means" or "step" clause as specified in 35 U.S. C. Section 112, Paragraph 6. In particular, the use of "step of" or "act of" in the Claims herein is not intended to invoke the provisions of 35 U.S.C. 112, Paragraph 6.

It is noted that, if used, the labels left, right, front, back, top, bottom, forward, reverse, clockwise and counterclockwise have been used for convenience purposes only and are not intended to imply any particular fixed direction. Instead, the labels are used to reflect relative locations and/or directions between various portions of an object.

Data processing may include data buffering, aligning incoming data from multiple communication lanes, forward error correction (FEC), etc. For example, data may be received by an analog front end (AFE), which can prepare the incoming data for digital processing. The digital portion of the transceivers (e.g., digital signal processor (DSP)) may provide skew management, equalization, reflection cancellation, and/or other functions. It is to be appreciated that the process described herein can provide many benefits, including saving both power and cost.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless explicitly stated otherwise, each numerical value and range may be interpreted as being approximate, as if the word "about" or "approximately" preceded the value of the value or range. Signals and corresponding nodes or ports might be referred to by the same name and are interchangeable for purposes here.

While embodiments may have been described with respect to circuit functions, the embodiments of the subject matter disclosed herein are not limited. Possible implementations may be embodied in a single integrated circuit, a multi-chip module, a single card, SoC, or a multi-card circuit pack. As would be apparent to one skilled in the art, the various embodiments might also be implemented as part of a larger system. Such embodiments may be employed in conjunction with, for example, a digital signal processor, microcontroller, field-programmable gate array, application-specific integrated circuit, or general-purpose computer.

As would be apparent to one skilled in the art, various functions of circuit elements may also be implemented as processing blocks in a software program. Such software may be employed in, for example, a digital signal processor, microcontroller, or general-purpose computer. Such software may be embodied in the form of program code embodied in tangible media, such as magnetic recording media, optical recording media, solid-state memory, floppy diskettes, CD-ROMs, hard drives, or any other non-transitory machine-readable storage medium, that when the program code is loaded into and executed by a machine, such as a computer, the machine becomes an apparatus for practicing the subject matter disclosed herein. When implemented on a general-purpose processor, the program code segments combine with the processor to provide a unique device that operates analogously to specific logic circuits. Described embodiments may also be manifest in the form of a bit stream or other sequence of signal values electrically or optically transmitted through a medium, stored magnetic-field variations in a magnetic recording medium, etc., generated using a method and/or an apparatus as described herein.

The systems and methods described herein may include and/or may be based on solid-state drives (SSDs). SSDs can include storage devices used in computers that store data on solid-state flash memory (e.g., NAND flash memory). NAND flash is a non-volatile storage technology that stores data without requiring power. NAND flash may be referred to as a memory chip. Flash memory cards and SSDs use multiple NAND flash memory chips to store data.

SSDs can work with a computer's memory (e.g., random-access memory (RAM)) and processor to access and use data. This includes files like operating systems, programs, documents, games, images, media, etc. The systems and methods described herein may include and/or may be based on RAM-based SSDs. RAM-based SSDs can include silicon microchips and use dynamic RAM (DRAM) or static RAM chips to store data electronically. RAM-based SSDs can be used for write-intensive workloads and offer better performance and endurance than flash-based SSDs. The systems and methods described herein may include and/or may be based on logical block addresses (LBAs). LBAs can include logical address that specify or map to physical addresses of an SSD (e.g., for read and write commands, etc.).

The systems and methods described herein may include and/or may be based on a logical-to-physical (L2P) table. An L2P table can include a mapping table that keeps track of the physical locations of data stored in a NAND flash array. The L2P table may include entries that map a logical data address to a corresponding physical data address. For instance, the L2P table may map a namespace (NS) and an LBA to a NAND physical addressing unit or physical block address (PBA).

The systems and methods described herein may include and/or may be based on peripheral component interconnect express (PCIe). PCIe can include an interface that connects high-speed data between electronic components in a computer system. PCIe can be used for connecting expansion cards to the motherboard, such as graphics cards, network cards, storage devices (e.g., SSDs), storage controllers, memory devices, memory controllers, processors, and the like.

The systems and methods described herein may include and/or may be based on non-volatile memory express (NVMe), such as NVMe SSDs. NVMe can be a data transfer protocol that may be configured to connect SSD storage to servers and/or processors using the PCIe bus. NVMe was created to improve speed and performance of computer systems. An NVMe controller can include a logical-device interface specification that allows access to a computer's non-volatile storage media. NVMe controllers are optimized for high-performance random read/write operations. In some cases, the NVMe controller can perform flash management operations of an SSD on-chip, while consuming negligible host processing and memory resources. NVMe can perform parallel input/output (I/O) operations with multicore processors to facilitate high throughput. NVMe controllers can map I/O and responses to shared memory in a host computer over a PCIe interface. In some cases, NVMe controllers can communicate directly with a host central processing unit (CPU). The systems and methods described herein may include and/or may be based on an NVMe namespace. An NVMe namespace can include a collection of LBAs accessible to a host. A namespace ID (NSID) can be an identifier used by a controller to provide access to a namespace. LBAs of an NVMe storage device can include a starting logical block address (SLBA) (e.g., of a set of LBAs, of an LBA range). In some cases, an NVMe storage device may indicate a number of logical blocks (NLB), which can specify the number of logical blocks that are part of a given LBA range.

The systems and methods described herein may include and/or may be based on Physical Region Pages (PRPs) and/or Scatter Gather Lists (SGLs). A PRP entry can include a pointer to a physical memory page. PRPs can be used as a scatter/gather mechanism for data transfers between a controller and memory. To enable efficient out of order data transfers between the controller and the host, PRP entries may be a fixed size. SGLs can include mechanisms to transfer data and commands based on the NVMe protocol, and to denote the location of a data buffer in host memory. SGLs can be used in conjunction with PRPs to represent a data buffer using multiple or single SGL or PRP entries, similar to a linked list.

The systems and methods may be based on virtualization systems. Virtualization can include a computing technology that creates virtual representations of physical machines, such as servers, storage, and/or networks, on at least one physical machine. Virtualization may be performed based on using virtual software to mimic the functions of physical hardware and separate computing environments from physical infrastructure.

The systems and methods described herein may include and/or may be based on virtual machines (VMs), containers, databases, file systems, applications, etc. A VM can be the virtualization or emulation of a computer system. Virtual machines can be based on computer architectures and provide the functionality of a physical computer. Their implementations may involve specialized hardware, software, or a combination of the two. In some cases, virtual machines can differ and can be organized by their function. A VM can include a software-based computer that acts like a physical computer. VMs can be referred to as guest machines. VMs can be created by borrowing resources from a physical host computer or a remote server. One or more virtual "guest" machines run on a physical "host" machine. In some cases, the systems and methods may be based on migrating a container, database, file system, and/or application from a destination machine to a source machine.

The systems and methods described herein may include and/or may be based on a translation cache. A translation cache can include a memory cache that stores recently used translations to reduce the time it takes to access a physical memory location. Translation caches can include translation lookaside buffers (TLBs). A TLB can be a type of translation cache that stores recent translations of virtual memory to physical addresses. TLBs may be associated with a processor's memory management unit (MMU) and can be located between the CPU and the CPU cache, between the CPU cache and the main memory, or between different levels of the multi-level cache. It is noted that an on-device Address Translation Cache (e.g., of an SSD) may be referred to as an input/output TLB (e.g., IOTLB). An IOTLB may be to an input/output memory management unit (IOMMU) as an TLB is to an MMU. For a CPU TLP, the consumer of the cache may be the CPU. For an IOTLB, the consumers may be I/O devices (e.g., an SSD).

In some examples, PCIe may use functions to enable separate access to its resources. These functions can include physical functions (e.g., PCIe physical function (PF)) and/or virtual functions (e.g., PCIe virtual function (VF)). In some cases, a PCIe device may be split into multiple physical functions. In some examples, the single root I/O virtualization (SR-IOV) interface is an extension to PCIe. SR-IOV can configure a physical device to appear as multiple separate physical devices (e.g., to a hypervisor, to a guest operating system, etc.). In some cases, SR-IOV allows a device (e.g., a network adapter) to separate access to its resources among various PCIe hardware functions. These functions can include physical functions (e.g., PCIe physical function) and/or virtual functions (e.g., PCIe virtual function). In some examples, SR-IOV may enable one PF and one or more VFs (e.g., where the VFs and PFs serve a similar function). In some cases, restructuring may provide various mixtures of PF and VF combinations. In some cases, a host may implement Scalable Input Output Virtualization (sIOV). In these examples, the host may use PCIe Requester IDs to differentiate different guest applications and associated submission queues. In some cases, the hypervisor may emulate portions of a PCIe function to assist in sIOV behaving like a VF.

The systems and methods described herein may include and/or may be based on one or more kernels. A kernel may include a computer program that is the core of an operating system (OS) and manages the computer's hardware, operations, etc. The kernel may be the primary interface between the computer's hardware and the software running on it. Kernels may be one of the first programs loaded into memory before the boot loader. When a system starts up, the basic input/output system (BIOS) may complete hardware initialization, then run a bootloader that loads the kernel into a protected memory space. Once loaded, the BIOS may transfer control to the kernel, which then loads other OS components to complete the startup process.

The systems and methods described herein may include and/or may be based on one or more hosts (e.g., virtual machine hosts), which may be referred to as host machines or host computers. A host can include the physical machine that runs VMs. The VMs that run on a host may be called guest VMs. Each guest VM can run on its own isolated partition on the host, separate from other guests. Each host can have its own operating system. In some examples, the systems and methods may be based on a guest kernel. A guest kernel may include a user-space executable kernel that runs inside a VM. A guest kernel may be used to create a VM, along with a root file system. The guest kernel may be passed to a hypervisor and used to boot the VM.

The systems and methods described herein may include and/or may be based on a hypervisor, also known as a virtual machine monitor (VMM) or virtualizer. A hypervisor can include a type of computer software, firmware, and/or hardware that creates and runs virtual machines. The term hypervisor can be a variant of "supervisor," a term that can be used for the kernel of an operating system: the hypervisor can be considered the supervisor of the supervisors, with hyper-being used as a stronger variant of super—from "supervisor." A computer on which a hypervisor runs one or more virtual machines can be referred to as a host machine, and each virtual machine can be referred to as a guest machine. The hypervisor presents the guest operating systems with a virtual operating platform and manages the execution of the guest operating systems. Unlike an emulator, the guest executes most instructions on the native hardware. Multiple instances of a variety of operating systems may share the virtualized hardware resources: for example, LINUX®, WINDOWS®, and MAC-OS® instances can all run on a single physical x86 machine. This contrasts with operating-system-level virtualization, where all instances (e.g. containers) may share a single kernel, though the guest operating systems can differ in user space, such as different Linux distributions with the same kernel.

In some cases, a hypervisor allows a single host computer to support multiple VMs by sharing resources, like memory and processing, etc. A hypervisor can do this by allocating the host server's compute, storage, and networking resources as needed by each VM. In some cases, a hypervisor enables virtualization of the compute and hardware resources of computers and servers, which can enable cloud computing. In some cases, the hypervisor isolates the hypervisor operating system and resources from the VMs, and enables the creation and management of those VMs. The VMs may not be aware their access to the hardware is virtualized, emulated, or protected from other users of the same hardware.

The systems and methods described herein may include and/or may be based on live migration. Live migration can include the process of moving a running VM or workload from one physical machine to another physical machine (e.g., from source host to destination host) without interrupting the client or application. During live migration, VM memory, storage, and network connectivity are transferred from the source machine to the destination machine. The systems and methods described herein may include and/or may be based on NVMe live migration, which can include migrating a VM with direct-attached NVMe devices from a source host to a destination host.

Live migration can be done using pre-copy mechanisms and/or post-copy mechanisms. With pre-copy, the destination may be resumed when all data and state has been migrated. For example, with pre-copy, all of the data and state are migrated before resuming the destination. With post-copy, the destination may be resumed when a sufficient amount of state has been migrated. With post-copy, a minimal process state may be transferred (e.g., application state in the case of generic workloads, where for a VM, that state is the vCPU state and virtual device state). However, transferring a minimal process state can cause a relatively large number of page faults when the destination resumes (e.g., zero memory pages have been transferred, only "state" has been transferred). In some cases, post-copy may be combined with a single "pass" (i.e., one iteration) of pre-copy, copying the memory (e.g., all of the memory) of the source before resuming the destination and proceeding in post-copy mode. Post-copy mechanisms may be used for write-centric workloads where the data is changing regularly or relatively often. Pre-copy mechanisms may be used for read-centric systems where data is more static, not changing regularly.

Reference to "state" may refer to a state of VM resources (e.g., state of VM resources associated with live migration). For example, "state" may refer to a state of VM memory, a state of VM storage, a state of VM processes, a state of VM threads, a state of VM settings and/or configuration, etc. Missing data (e.g., data missing from a transfer of a given VM state) can be retrieved from the source on demand. It is noted that reference to "source" may refer to a source computer, source host, source device, source machine, etc. Reference to "destination" may refer to a destination computer, destination host, destination device, destination machine, etc.

The systems and methods described herein may include and/or may be based on translation agent (TA) of a computer system (e.g., of a destination device). A TA may be configured to translate addresses for devices (e.g., storage drives, PCIe devices) on behalf of a host. The TA may include a memory manager. In some cases, the TA may be configured as or may include a memory management unit (MMU) or input/output memory management unit (IOMMU). In some cases, the TA may include a cache or buffer such as a Translation Lookaside Buffer (TLB). In some cases, the TA may store one or more mappings and/or mapping tables in the buffer. A TA may be managed by software (e.g., operating system) and/or a hypervisor. In some cases, the TA may be incorporated in and/or operate in conjunction with a processor (e.g., a CPU of the destination device). The TA may operate in conjunction with a storage device in the retrieval of data or memory pages. The memory mapping tables of the TA may indicate whether a memory page requested by a storage drive is available on a destination device. The TA may provide translations from virtual addresses to physical addresses. The TA may manage the memory of a machine (e.g., DRAM of the destination device, the total available DRAM of the destination device). A virtual machine of a destination device may be assigned some address range of memory. The TA may map this address range of memory to the physical memory (e.g., DRAM) of the destination device. The TA may map (e.g., via at least one mapping table) the virtual address range of the VM to the physical memory of the DRAM memory of the destination device.

In some cases, storage drives (e.g., SSDs) may include a queue length, queue size, or queue depth (QD). QD can be the number of input/output (I/O) requests that a storage device can handle at any given time. In some cases, QD may refer to the number of IO operations a host can queue for a storage device. For example, QD may refer to the number of IO operations a host can queue for live migration.

The systems and methods described herein may include and/or may be based on one or more queues. In some cases, systems and methods described herein may include and/or may be based on a controller data queue. A controller data queue may include a submission queue (SQ) and/or a completion queue (CQ). The SQ may include a circular buffer that holds commands to be executed by the controller. The host software may prepare the commands and update the queue's tail pointer register when new commands are ready. The controller may pick up the queue entries in order, but may execute them in any order. The CQ may include a circular buffer that holds the status of completed commands. The controller may append an entry to the CQ when it has finished processing a command.

The systems and methods described herein may include and/or may be based on direct memory access (DMA). DMA can include computer bus architecture features that allow data to be transferred directly from an attached device to main memory without involving the CPU, freeing up the CPU to focus on other tasks.

Some systems may intentionally cause page faults (e.g., by CPU access to missing memory pages). Some systems may force page faults through CPU accesses to potentially relevant memory. In some configurations, the TA may include its own internal memory to store address mappings. In some cases, the TA may swap out one or more pages when the TA runs out of space for the mappings in its internal memory. In some cases, an IOMMU may walk (e.g., page walk) mapping tables that are located in host memory, and pages in the host memory may be swapped out based on memory space constraints. Some Live Migration systems may implement (e.g., exclusively implement) pre-copy migration. In some systems, VM state may be copied in iterations from Source to Destination, and the Destination may resume once a Steady State is reached. To reach the Steady State, a "stop-and-copy" stage may be used where both the Source and Destination are paused or suspended to copy remaining changes (e.g., pause state, blackout stage). The systems and methods described reduce this pause state.

The systems and methods described herein may be used to implement post-copy migration, enabling the Destination to resume at an earlier stage (e.g., prior to a Steady State being reached), thus reducing the pause state. The systems and methods enable a Source state to be retrieved on-demand from the Destination (e.g., to retrieve missing data). In some examples, the systems and methods described herein enable post-copy NVMe live migration for NVMe Data In commands and/or Data Out commands. In some cases, post-copy NVMe Live Migration for NVMe Data In and Data Out Commands may be based on mechanisms that enable a hypervisor to retrieve missing data (e.g., missing LBAs, dirty data) on-demand from a Source VM attached NVMe Storage Device based on this data being accessed by the Destination VM NVMe Storage Device. In some cases, post-copy NVMe Live Migration for NVMe Data In and/or Data Out Commands may enable a device to instruct the hypervisor to retrieve missing LBAs from the Source VM attached NVMe Storage Device when requested by the Destination VM.

The systems and methods described herein may include predicting page faults. For example, the systems and methods may include detecting a page fault before the page fault occurs. Based on the systems and methods, a device may use PCI Express functionalities to determine that a DMA is likely to fault and request the Host to resolve the expected fault. For example, the device may use a PCIe Address Translation Services Address Translation Request to determine that a DMA is likely to fault and use the PCIe Page Request Interface Extension of the Address Translation Services Extended Capability to request the Host to resolve the expected fault by transferring the missing data from the source to the destination.

Based on the systems and methods, a device may use an on-device mapping table to determine whether an LBA is present. In some cases, a storage drive may use a controller data queue to instruct the Host to retrieve missing LBAs. The controller data queue may function as a completion queue (CQ).

FIG. 1 illustrates an example system 100 in accordance with one or more implementations as described herein. In FIG. 1, machine 105, which may be termed a host, a system, or a server, is shown. While FIG. 1 depicts machine 105 as a tower computer, embodiments of the disclosure may extend to any form factor or type of machine. For example, machine 105 may be a rack server, a blade server, a desktop computer, a tower computer, a mini tower computer, a desktop server, a laptop computer, a notebook computer, a tablet computer, etc.

Machine 105 may include processor 110, memory 115, and storage device 120. Processor 110 may be any variety of processor. It is noted that processor 110, along with the other components discussed below, are shown outside the machine for ease of illustration: embodiments of the disclosure may include these components within the machine. While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), Phase Change Memory (PCM), or Resistive Random-Access Memory (ReRAM). Memory 115 may include volatile and/or non-volatile memory. Memory 115 may use any desired form factor: for example, Single In-Line Memory Module (SIMM), Dual In-Line Memory Module (DIMM), Non-Volatile DIMM (NVDIMM), etc. Memory 115 may be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may support an operating system under which various applications may be running. These applications may issue requests (which may be termed commands) to read data from or write data to either memory 115 or storage device 120. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe) protocol, a Serial Attached Small Computer System Interface (SCSI) (SAS) protocol, or a Serial AT Attachment (SATA) protocol. Storage device 120 may include any desired interface, including, for example, a Peripheral Component Interconnect Express (PCIe) interface, or a Compute Express Link (CXL) interface. Storage device 120 may take any desired form factor, including, for example, a U.2 form factor, a U.3 form factor, a M.2 form factor, Enterprise and Data Center Standard Form Factor (EDSFF) (including all of its varieties, such as E1 short, E1 long, and the E3 varieties), or an Add-In Card (AIC).

While FIG. 1 uses the term "storage device," embodiments of the disclosure may include any storage device formats that may benefit from the use of computational storage units, examples of which may include hard disk drives, Solid State Drives (SSDs), or persistent memory devices, such as PCM, ReRAM, or MRAM. Any reference to "storage device" "SSD" below should be understood to include such other embodiments of the disclosure and other varieties of storage devices. In some cases, the term "storage unit" may encompass storage device 120 and memory 115. Machine 105 may include power supply 135. Power supply 135 may provide power to machine 105 and its components.

Machine 105 may include transmitter 145 and receiver 150. Transmitter 145 or receiver 150 may be respectively used to transmit or receive data. In some cases, transmitter 145 and/or receiver 150 may be used to communicate with memory 115 and/or storage device 120. Transmitter 145 may include write circuit 160, which may be used to write data into storage, such as a register, in memory 115 and/or storage device 120. In a similar manner, receiver 150 may include read circuit 165, which may be used to read data from storage, such as a register, from memory 115 and/or storage device 120. In the illustrated example, machine 105 may include timer 155, which may be used to time one or more operations, indicate a time period, indicate a lapse of time, indicate an expiration, indicate a timeout, etc.

In one or more examples, machine 105 may be implemented with any type of apparatus. Machine 105 may be configured as (e.g., as a host of) one or more of a server such as a compute server, a storage server, storage node, a network server, a supercomputer, data center system, and/or the like, or any combination thereof. Additionally, or alternatively, machine 105 may be configured as (e.g., as a host of) one or more of a computer such as a workstation, a personal computer, a tablet, a smartphone, and/or the like, or any combination thereof. Machine 105 may be implemented with any type of apparatus that may be configured as a device including, for example, an accelerator device, a storage device, a network device, a memory expansion and/or buffer device, a central processing unit (CPU), a graphics processing unit (GPU), a neural processing unit (NPU), a tensor processing unit (TPU), optical processing units (OPU), and/or the like, or any combination thereof.

Any communication between devices including machine 105 (e.g., host, computational storage device, and/or any intermediary device) can occur over an interface that may be implemented with any type of wired and/or wireless communication medium, interface, protocol, and/or the like including PCIe, NVMe, Ethernet, NVMe-oF, Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), Advanced eXtensible Interface (AXI) and/or the like, or any combination thereof, Transmission Control Protocol/Internet Protocol (TCP/IP), FibreChannel, InfiniBand, Serial AT Attachment (SATA), Small Computer Systems Interface (SCSI), Serial Attached SCSI (SAS), iWARP, any generation of wireless network including 2G, 3G, 4G, 5G, and/or the like, any generation of Wi-Fi, Bluetooth, near-field communication (NFC), and/or the like, or any combination thereof. In some embodiments, the communication interfaces may include a communication fabric including one or more links, buses, switches, hubs, nodes, routers, translators, repeaters, and/or the like. In some embodiments, system 100 may include one or more additional apparatus having one or more additional communication interfaces.

Any of the functionality described herein, including any of the host functionality, device functionally, migration manager 140 functionality, and/or the like, may be implemented with hardware, software, firmware, or any combination thereof including, for example, hardware and/or software combinational logic, sequential logic, timers, counters, registers, state machines, volatile memories such as at least one of or any combination of the following: dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application specific integrated circuits (ASICs) CPUs including complex instruction set computer (CISC) processors such as x86 processors and/or reduced instruction set computer (RISC) processors such as RISC-V and/or ARM processors), GPUs, NPUs, TPUs, OPUs, and/or the like, executing instructions stored in any type of memory. In some embodiments, one or more components of migration manager 140 may be implemented as an SoC.

In some examples, migration manager 140 may include any one or combination of logic (e.g., logical circuit), hardware (e.g., processing unit, memory, storage), software, firmware, and the like. In some cases, migration manager 140 may perform one or more functions in conjunction with processor 110. In some cases, at least a portion of migration manager 140 may be implemented in or by processor 110 and/or memory 115. The one or more logic circuits of migration manager 140 may include any one or combination of multiplexers, registers, logic gates, arithmetic logic units (ALUs), cache, computer memory, microprocessors, processing units (CPUs, GPUs, NPUs, and/or TPUs), FPGAs, ASICs, etc., that enable migration manager 140 to provide systems and methods for live migration with assigned devices.

In one or more examples, migration manager 140 may perform one or more operations of the systems and methods described herein. In some cases, migration manager 140 may include logic to enable systems and methods for live migration with assigned devices. In some cases, migration manager 140 may include or may incorporate a hypervisor or virtual machine manager. The logic of migration manager 140 may include any combination of hardware (e.g., at least one memory, at least one processor), logical circuitry, firmware, and/or software to enable systems and methods for live migration with assigned devices. The systems and methods described herein can include mechanisms for handling Write Faulting and/or Read Faulting. In some cases, Write Faulting can include device on-demand paging of host memory involved in User Data Out commands (e.g., writing data to SSD that is not resident in host memory of destination device). In some cases, Read Faulting can include device on-demand retrieval of LBAs involved in User Data In commands (e.g., reading data from SSD that is not resident on destination device). Based on the systems and methods described, a storage drive may predict a fault based on some command (e.g., a write command, read command, allocation command from a host of the storage drive). The storage drive may pause the command and communicate a message to the hypervisor (e.g., communicated via a translation agent and/or a controller data queue). The hypervisor may resolve the fault (e.g., populate the missing data) and communicate the resolution to the storage drive, and the storage drive may resume the executing the command. In some examples, the systems and methods may include mechanisms to cause memory accessed by a destination device to be acquired from a source device (e.g., from a source VM). Based on the systems and methods, a source state may be retrieved on-demand from the destination (e.g., via a hypervisor). Based on the systems and methods, relevant memory/data may be identified and the systems and methods may prioritize the relevant memory/data. In some cases, the systems and methods may identify irrelevant memory and avoid prioritizing the irrelevant memory. Based on the systems and methods described, a time associated with a pause state may be reduced.

Figure 2:
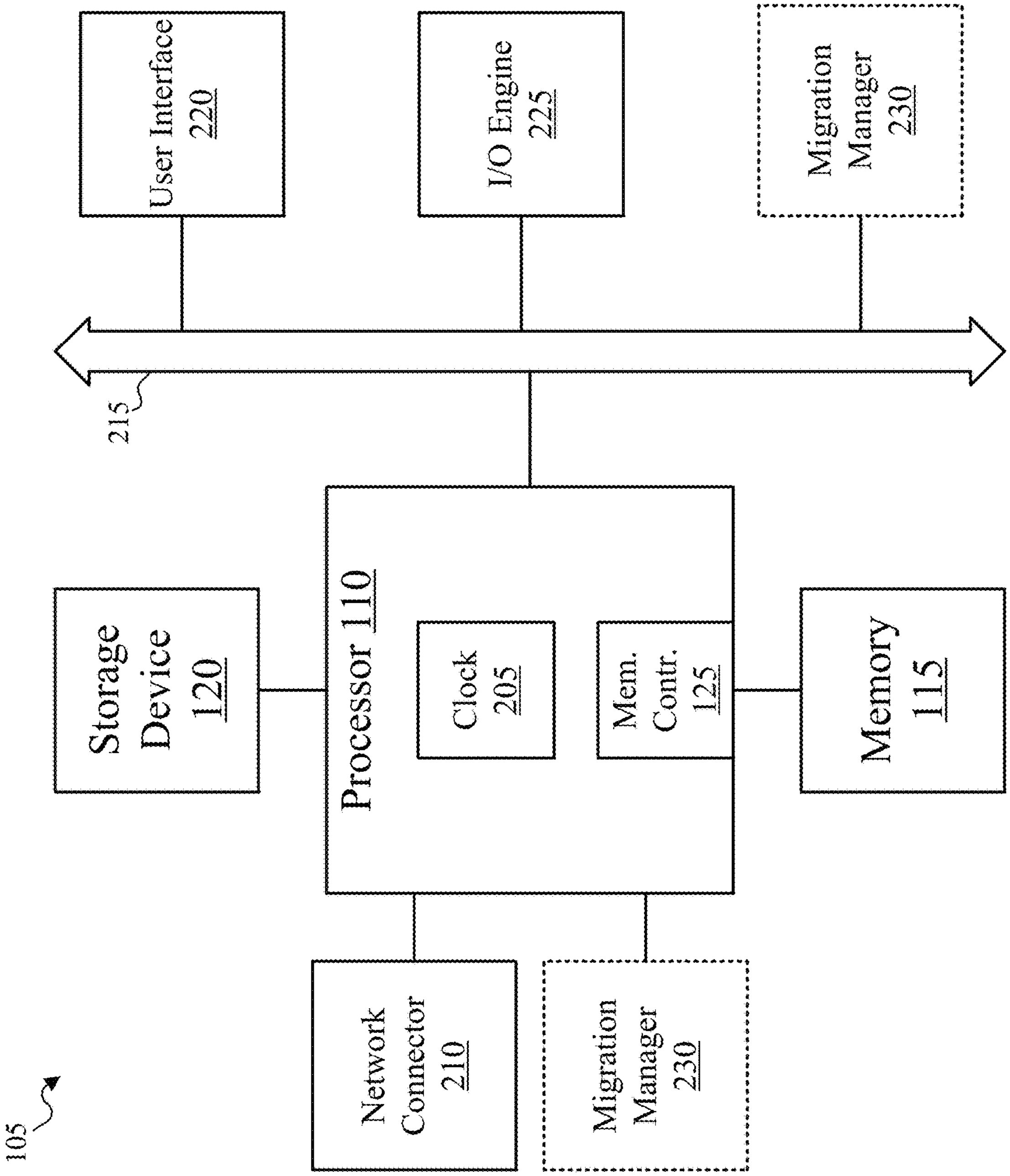
FIG. 2 illustrates details of the system of FIG. 1, according to one or more implementations as described herein.

FIG. 2 illustrates details of machine 105 of FIG. 1, according to examples described herein. In the illustrated example, machine 105 may include one or more processors 110, which may include memory controllers 125 and clocks 205, which may be used to coordinate the operations of the components of the machine. Processors 110 may be coupled to memories 115, which may include random access memory (RAM), read-only memory (ROM), or other state preserving media, as examples. Processors 110 may be coupled to storage devices 120, and to network connector 210, which may be, for example, an Ethernet connector or a wireless connector. Processors 110 may be connected to buses 215, to which may be attached user interfaces 220 and Input/Output (I/O) interface ports that may be managed using I/O engines 225, among other components. As shown, processors 110 may be coupled to migration manager 230, which may be an example of migration manager 140 of FIG. 1. In some cases, migration manager 230 may include or may be implemented as a hypervisor. Additionally, or alternatively, processors 110 may be connected to buses 215, to which may be attached migration manager 230.

Figure 3:
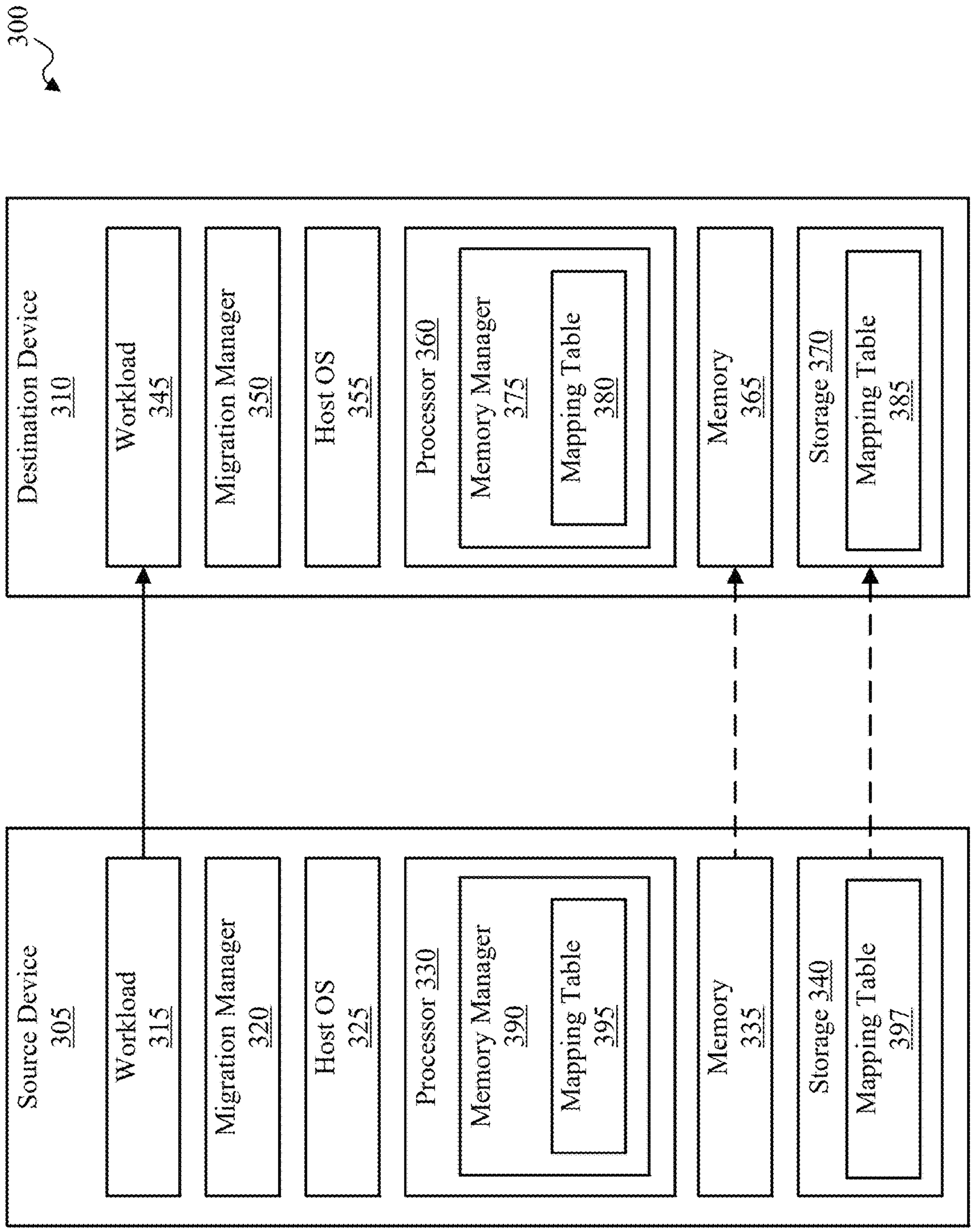
FIG. 3 illustrates an example system in accordance with one or more implementations as described herein.

FIG. 3 illustrates an example system 300 in accordance with one or more implementations as described herein. In some configurations, one or more aspects of system 300 may be implemented by or in conjunction with migration manager 140 of FIG. 1 and/or migration manager 230 of FIG. 2. In some configurations, one or more aspects of system 300 may be implemented by or in conjunction with machine 105, components of machine 105, or any combination thereof.

In the illustrated example, system 300 may include source device 305 and destination device 310. As shown, source device 305 may include and/or operate in conjunction with workload 315, migration manager 320, host operating system 325, processor 330, memory 335, and/or storage 340. As shown, destination device 310 may include and/or operate in conjunction with workload 345, migration manager 350, host operating system 355, processor 360, memory 365, and/or storage 370. In some cases, storage 340 and/or storage 370 may include a storage drive (e.g., SSD).

In the illustrated example, processor 330 may include memory manager 390, and memory manager 390 may include at least one mapping table (e.g., mapping table 395). In some cases, memory manager 390 may include a memory management unit, an input/output memory management unit, and/or a translation agent. In some cases, mapping table 395 may be stored in a buffer of memory manager 390. As shown, storage 340 may include at least one mapping table (e.g., mapping table 397).

In the illustrated example, processor 360 may include memory manager 375, and memory manager 375 may include at least one mapping table (e.g., mapping table 380). In some cases, memory manager 375 may include a memory management unit, an input/output memory management unit, and/or a translation agent. In some cases, mapping table 380 may be stored in a buffer of memory manager 375. As shown, storage 370 may include at least one mapping table (e.g., mapping table 385). In some cases, processor 330 may include a memory manager (e.g., a memory manager with a mapping table). In some cases, storage 340 may include a mapping table.

In some examples, mapping table 380 and/or mapping table 395 may include data or metadata associated with memory pages (e.g., memory pages transferred to destination device 310, memory pages unavailable on, pending transfer to, or not yet transferred to destination device 310, missing from mapping table 380, etc.). In some cases, mapping table 380 and/or mapping table 395 may include a virtual to physical table. For example, mapping table 380 and/or mapping table 395 may provide a translation or a mapping of a virtual page (e.g., memory page) to a physical page on a memory (e.g., memory 335, memory 365), or a block of physical memory where the data of the virtual page is actually stored.

In some examples, mapping table 385 and/or mapping table 397 may include data or metadata associated with logical block addresses (LBAs) (e.g., LBAs transferred to destination device 310, LBAs unavailable on, pending transfer to, or not yet transferred to destination device 310, missing from mapping table 385, etc.). In some cases, mapping table 385 and/or mapping table 397 may include a logical-to-physical (L2P) table. For example, mapping table 385 and/or mapping table 397 may provide a translation or a mapping of a logical address (e.g., LBA) to a physical address on a storage drive (e.g., storage 340, storage 370), or a block of physical storage where the data of the LBA is actually stored.

In some embodiments, a storage drive receiving a migration may have a mapping table entry for every entry. This entry may be initialized at the beginning of the process to a value that signals it is unavailable (e.g., 0XFFFF indicates the data is not transferred, unavailable; 0X0000 indicates the data is transferred and available; or vice versa). The value may be selected such that it does not have an overlapping meaning in the "Physical" location of the L2P look up process within the storage drive. In some cases, the initialized value may be the same value that signals "unmapped" in the drive, or unmapped may be indicated with a different value. When data is migrated to the drive, the value in the mapping table may be changed to a value indicated the data is transferred/available. Thus, when the migrated VM reads data, and the destination storage drive examines the look-up table to discover the value, the destination storage drive can determine if the data is available or not. When the storage drive uses the same value for unmapped and not yet migrated, then the storage drive may trigger an unnecessary read to the source storage drive that would still be returned with a value of "unmapped."

In some examples, the storage drive may include a mapping table (e.g., a second table) that tracks whether the data has been migrated. This table may be a binary table with a bit for each mapping table entry (e.g., binary 0 indicates the data is not transferred, unavailable; binary 1 indicates the data is transferred and available; or vice versa).

In some examples, the storage drive may store the data that has been migrated in a set of ranges. For example, the host may migrate from LBA 0 through N. When the host is currently on LBA M (e.g., $0<M<N$) the drive may track that all data below M has been migrated. The drive may track the migration in several ranges (e.g., when the host does a relatively complex migration of LBAs). The drive may track M, but the drive may determine that some of the LBAs are delayed. Thus, the drive may monitor a leading edge of M that has some gaps that are filling in the relatively near future. The drive may store the LBAs that are incoming and which are still missing prior to moving up the value of M, which represents all LBAs that have been migrated up to a given point.

In some examples, the drive may track granularities of migrated data (e.g., similar to storing the migrated data in a set of ranges). In some cases, the drive may track (e.g., may only be able to track) a limited number of granularities at a given time. For example, the drive may monitor when groups of 10 LBAs are migrating. The drive may monitor that each of the LBAs in the group of 10 is migrated before moving this granularity over into the fully migrated granularity list. In some cases, this list may use a bit per granularity to track progress.

In some examples, workload 315 may be an example of a virtual machine or any process of source device 305. In some cases, workload 345 may be an example of a virtual machine or any process on destination device 310. In some examples, source device 305 may include one or more workloads or processes (e.g., virtual machines, workload 315) that may be configured to utilize resources of source device 305 (e.g., processor 330, memory 335, storage 340). In some cases, destination device 310 may include one or more workloads or processes (e.g., virtual machines, workload 345) that may be configured to utilize resources of source device 305 (e.g., processor 330, memory 335, storage 340). The systems and methods described herein may include migration of a process or workload of source device 305 to destination device 310. For example, workload 315 may be migrated or transferred from source device 305 to destination device 310, where the workload transferred to destination device 310 may be referred to as workload 345 in system 300.

In the illustrated example, workload 315 may be running and/or interacting with the storage 340 (e.g., writing data to storage 340, reading data from storage 340, allocating space to storage 340, etc.). As shown, migration manager 320 and migration manager 350 may coordinate transfer data, settings, configurations of workload 315 to workload 345. As shown, copying workload 315 to workload 345 may include copying data from memory 335 to memory 365 and/or copying data from storage 340 to storage 370. In some cases, two or more items may be tracks in a given mapping table (e.g., mapping table 380, mapping table 385, mapping table

395, mapping table 397). For example, a mapping table may track whether a given location has been accessed (e.g., ever been accessed). In some cases, a mapping table may track whether data is dirty. In some cases, a location that has not been tracked (e.g., never been tracked) may not be copied. In some cases, a mapping table may include a bit (e.g., accessed bit) to indicate whether a location has been accessed.

In some examples, migration manager 320 and migration manager 350 may coordinate copying host memory of workload 315 (e.g., a portion of memory 335 allocated to workload 315) from source device 305 to destination device 310 (e.g., to memory 365 of destination device 310). Migration manager 320 and migration manager 350 may coordinate copying data of storage 340 (e.g., user data) from device 305 to destination device 310 (e.g., to storage 370 of destination device 310). In some cases, migration manager 320 and migration manager 350 may coordinate performing one transfer operation of copying the memory of workload 315 to destination device 310. For example, migration manager 320 and migration manager 350 may coordinate transferring the memory of workload 315 in one batch (e.g., not a multi-iteration transfer or looping transfer). In some cases, migration manager 320 and migration manager 350 may coordinate performing one transfer operation of copying the data of workload 315 stored in storage 340 to destination device 310. For example, migration manager 320 and migration manager 350 may coordinate transferring the data of workload 315 stored in storage 340 in one batch (e.g., not a multi-iteration transfer or looping transfer).

In some examples, based on the transfer of memory and data to destination device 310, migration manager 320 and migration manager 350 may coordinate pausing workload 315 (e.g., pause workload 315 from continuing to process commands, tasks, processes, etc., on source device 305). In some cases, migration manager 320 and migration manager 350 may coordinate pausing storage 340 based on the transfer of memory and data to destination device 310.

In some examples, migration manager 320 and migration manager 350 may coordinate copying processing threads of workload 315 from source device 305 to destination device 310 (e.g., to workload 345). In some cases, there may be some number of changes to the memory of workload 315 between copying the memory of workload 315 (e.g., in single batch operation) and pausing workload 315. In some cases, migration manager 320 and migration manager 350 may coordinate obtaining a list of the number of memory page changes (e.g., memory pages on source device 305 associated with the number of changes). In some cases, migration manager 350 may mark those memory pages as unavailable on destination device 310. In some cases, memory manager 375 may maintain in mapping table 380 a list of memory pages available on destination device 310 and/or maintain in mapping table 380 a list of memory pages unavailable on destination device 310. When workload 345 attempts to access a memory page that is unavailable (e.g., not yet transferred to destination device 310), mapping table 380 indicates the memory page is unavailable, and may result in a page fault for that memory page, which may be referred to as write faulting. This page fault may be referred to as write faulting because from a storage perspective, the storage drive (e.g., storage 370) may be attempting to read data from the memory (e.g., memory 365) to write that data into LBAs of the storage drive. However, this page fault may be considered a read operation from the perspective of the memory. In some examples, such a read operation may include a virtual machine (e.g., workload 345) attempting to read its own memory (e.g., memory 365) for purposes that do not involve the storage drive.

In some cases, there may be some number of changes to the data of workload 315 (e.g., user data stored in storage 340) between copying the data of workload 315 (e.g., in single batch operation) and pausing storage 340. In some cases, migration manager 320 and migration manager 350 may coordinate obtaining a list of the number of user data changes (e.g., LBAs of storage 340 associated with the number of changes). In some cases, migration manager 350 may mark those LBAs as unavailable on destination device 310. In some cases, storage 370 may maintain in mapping table 385 a list of LBAs available on destination device 310 and/or maintain in mapping table 385 a list of LBAs unavailable on destination device 310. When workload 345 attempts to access an LBA that is unavailable (e.g., write to an LBA not yet transferred to destination device 310), mapping table 385 indicates the LBA is unavailable, and may result in a read error for that LBA, which may be referred to as read faulting.

There may be situations where the migrated VM writes to a DRAM memory location and/or an LBA that is in a “not yet available” list. When this occurs in either case, then the VM’s write may be accepted, and the location may be removed from the list. Thus, during the transfer step, there may be a check by a translation agent and/or a memory manager to confirm that the incoming memory transfer isn’t already valid. In some cases, the incoming transfer may be discarded when it is confirmed that the incoming memory transfer is already valid.

In some examples, migration manager 350 may resume storage 370 (e.g., make storage 370 the active storage resource for the transferred workload) and/or may resume workload 345 (e.g., make workload 345 the active operational environment for the transferred workload). In some cases, migration manager 350 may copy the number of changes to the memory of workload 315 to destination device 310 (e.g., to memory 365) and/or may copy the number of changes to the data of workload 315 to destination device 310 (e.g., to storage 370).

When a read to memory of workload 345 occurs for a memory page not yet transferred, then write faulting mitigation may be performed. For example, memory manager 375 may page fault to migration manager 350 because mapping table 380 does not have a valid address for that memory page (e.g., as indicated in mapping table 380). Migration manager 350 may coordinate with migration manager 320 to copy this particular data to memory 365 and, once transferred, return the page fault to memory manager 375 (e.g., respond to memory manager 375 that the fault has been resolved).

When a read to storage 370 occurs for an LBA that was marked as not present in mapping table 385, then read faulting mitigation may be performed. For example, storage 370 may fault to migration manager 350 because storage 370 does not have the data for that LBA (e.g., as indicated in mapping table 385). Migration manager 350 may coordinate with migration manager 320 to copy this particular data to storage 370 and, once transferred, return the fault to storage 370 (e.g., respond to storage 370 that the fault has been resolved). In some cases, migration manager 350 may request that migration manager 320 prioritize the transfer of this particular data to storage 370. In some examples, migration manager 320 may delete one or more aspects associated with workload 315 (e.g., delete data, memory, threads, configurations, settings of workload 315)

Figure 4:
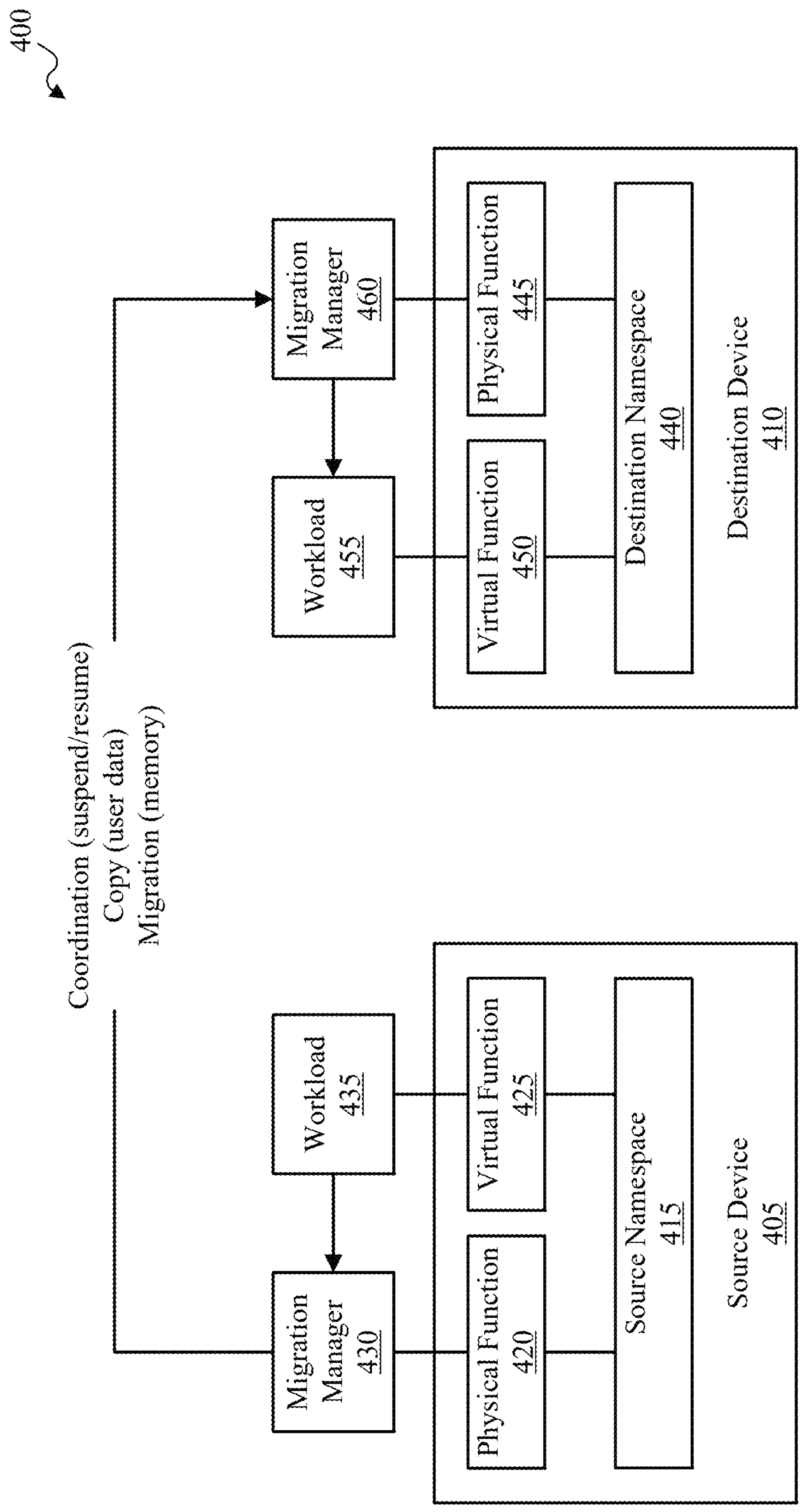
FIG. 4 illustrates an example system in accordance with one or more implementations as described herein.

FIG. 4 illustrates an example system 400 in accordance with one or more implementations as described herein. In some examples, system 400 may include systems and methods for live migration with assigned devices. In the illustrated example, the system may depict operations associated with live migration from source device 405 to destination device 410. For example, system 400 may depict a transfer of memory (e.g., virtual machine data in a source memory) and/or a transfer of user data (e.g., user data stored on a source storage drive transferred to a destination storage drive).

In the illustrated example, system 400 may include source device 405 and destination device 410. As shown, source device 405 may include and/or operate in conjunction with source namespace 415, physical function 420, virtual function 425, migration manager 430, and/or workload 435. In some cases, workload 435 may be an example of a virtual machine or any process of source device 405. In some cases, workload 455 may be an example of a virtual machine or any process on destination device 410. As shown, destination device 410 may include and/or operate in conjunction with destination namespace 440, physical function 445, virtual function 450, workload 455, and/or migration manager 460.

Source device 405 may be an example of source device 305; destination device 410 may be an example of destination device 310; migration manager 430 may be an example of migration manager 320; migration manager 460 may be an example of migration manager 350; workload 435 may be an example of workload 315; workload 455 may be an example of workload 345.

As shown, migration manager 430 may coordinate with migration manager 460 to perform one or more aspects of a live migration from source device 405 to destination device 410, including suspending and/or resuming one or more processes, threads, commands, hardware (e.g., storage, memory), workloads (e.g., workload 435, workload 455). As shown, live migration from migration manager 430 to migration manager 460 may include migrating memory from workload 435 to workload 455 and/or copying user data from source namespace 415 to destination namespace 440.

In some embodiments, system 400 may include software instantiations of storage devices (e.g., source device 405, destination device 410). Such devices may include devices based on non-volatile memory express over fabric (NVMe-oF). Implementations may include the software entity within a first enclosure present an NVMe interface to a second enclosure. The software entity presenting itself as an NVMe device may be based on some number of devices, (e.g., 20 drives within the first enclosure). The software entity may provide additional services (e.g., erasure coding to protect against drive loss within the first enclosure). It is noted that a VM may not include the workload with software instantiations. Such software instantiations may be implemented in data center applications (e.g., the data center may include a database that it is running). Accordingly, the systems and methods may include software instantiations that include one or more source enclosures that present an NVMe instantiation of a storage device to a data center. The data center's database may use this enclosure to store data. In some cases, the data center may determine to offline the enclosure (e.g., for repairs). The live migration process may be performed onto one or more new destination enclosures. It is noted that software instantiations may apply to enclosure or to racks of multiple enclosures (e.g., racks with 10 and 40 enclosures).

Figure 5:
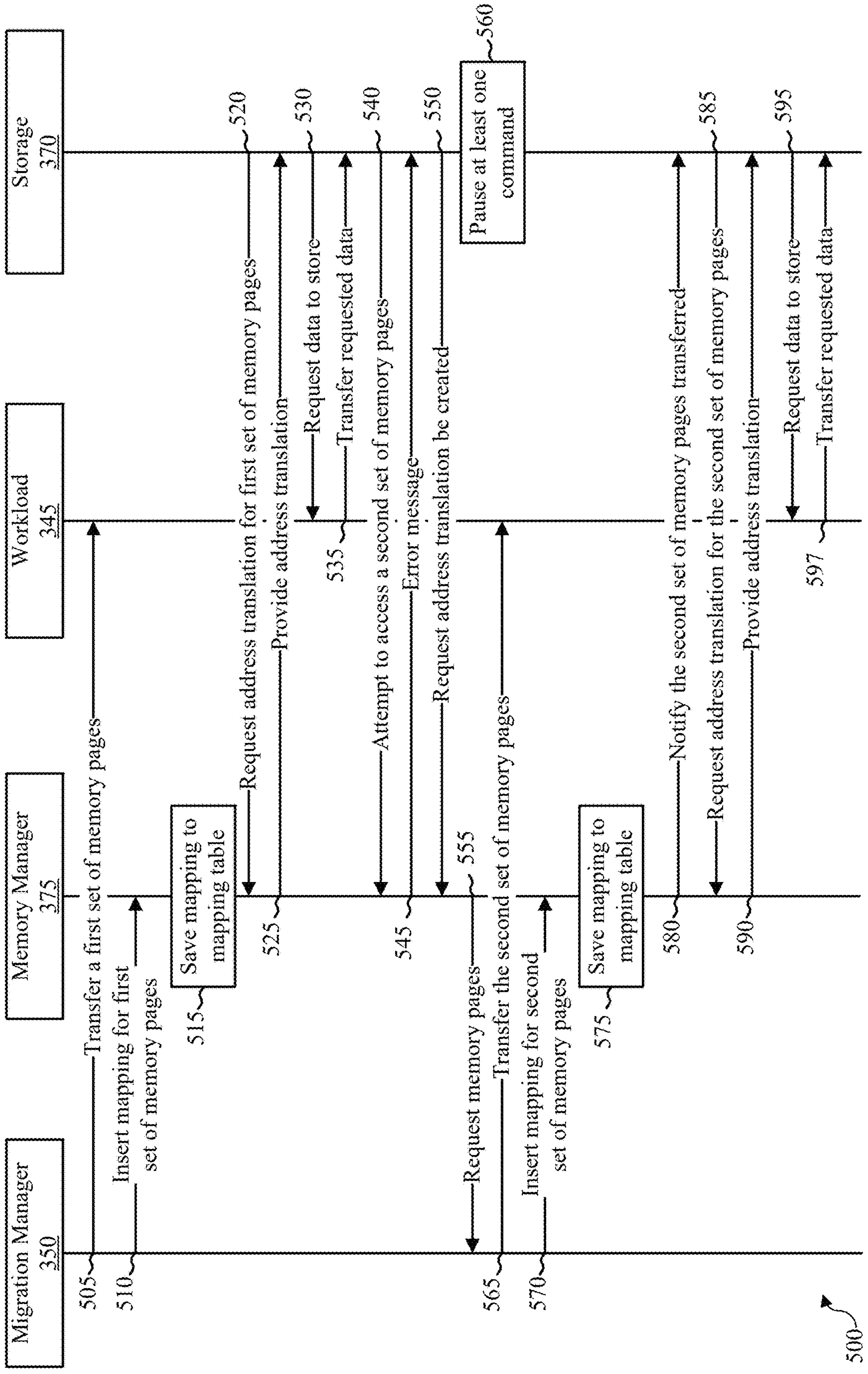
FIG. 5 illustrates an example flow diagram in accordance with one or more implementations as described herein.

FIG. 5 depicts a swim diagram illustrating example method 500 associated with the disclosed systems, in accordance with example implementations described herein. In some configurations, one or more aspects of method 500 may be implemented by or in conjunction with migration manager 140 of FIG. 1 and/or migration manager 230 of FIG. 2. In some configurations, one or more aspects of method 500 may be implemented by or in conjunction with machine 105, components of machine 105, or any combination thereof. The depicted method 500 is just one implementation and one or more operations of method 500 may be rearranged, reordered, omitted, and/or otherwise modified such that other implementations are possible and contemplated.

At 505, migration manager 350 may transfer a first set of memory pages (e.g., data of the first set of memory pages) to workload 345. For example, migration manager 350 may transfer a first set of memory pages from a memory of a source workload (e.g., virtual memory of workload 315) to the virtual memory of workload 345. The virtual memory of workload 315 may be mapped to a portion of physical memory of the source device (e.g., memory 335), while the virtual memory of workload 345 may be mapped to a portion of physical memory on the destination device (e.g., memory 365).

At 510, migration manager 350 may insert a mapping for the first set of memory pages in memory manager 375. For example, migration manager 350 may insert the mapping for the first set of memory pages in a memory table of memory manager 375. In some cases, migration manager 350 may generate the mapping and send the mapping to memory manager 375. Alternatively, migration manager 350 may instruct memory manager 375 to generate the mapping and to save the generated mapping to the mapping table of memory manager 375.

At 515, memory manager 375 may save the mapping to the mapping table. In some cases, memory manager 375 may save the mapping table in a buffer of memory manager 375 (e.g., a translation lookaside buffer of memory manager 375).

At 520, storage 370 may request address translation of the first set of memory pages. For example, based on the migration manager 350 transferring the first set of memory pages, storage 370 may successfully request address translation of the first set of memory pages via memory manager 375.

At 525, memory manager 375 may provide storage 370 the address translation of the first set of memory pages. In some examples, workload 345 may provide an address translation from a virtual address to a physical address, enabling storage 370 to access the physical location of the memory pages. In some cases, storage 370 may store data associated with the first set of memory pages on storage 370.

At 530, storage 370 may request data to store. For example, storage 370 may request from workload 345 data to store at storage 370 based on the address translation of the first set of memory pages.

At 535, workload 345 may transfer the requested data. For example, workload 345 may transfer the data from a memory of workload 345 to storage 370 (e.g., based on a write command associated with the first set of memory pages).

At 540, storage 370 may attempt to access a second set of memory pages. For example, storage 370 may receive a request (e.g., from a host, operating system, workload 345, etc.) to access the second set of memory pages.

At 545, memory manager 375 may send a message to storage 370. For example, memory manager 375 may send a message to storage 370 based on the attempt to access the second set of memory pages. In the depicted example, the message may be an error message. In some cases, the message may indicate that the second set of memory pages are unavailable.

At 550, storage 370 may communicate a request to memory manager 375. For example, storage 370 may request that an address translation be created for the second set of memory pages.

At 555, memory manager 375 may communicate a request to migration manager 350. For example, memory manager 375 may request that the migration manager 350 transfer the second set of memory pages (e.g., data of the second set of memory pages).

At 560, storage 370 may pause at least one command associated with the second set of memory pages. For example, storage 370 may attempt to access the second set of memory pages based on one or more commands. In some cases, storage 370 may attempt to access the second set of memory pages based on at least one of a write command, a read command, an allocation command, etc. Accordingly, storage 370 may pause at least one of a write command, a read command, an allocation command, etc. In some cases, storage 370 may pause a write command associated with the second set of memory pages.

At 565, migration manager 350 may transfer the second set of memory pages. In some examples, migration manager 350 may transfer the second set of memory pages based on migration manager 350 requesting that a source device (e.g., source device 305) transfer the second set of memory pages to a destination device (e.g., destination device 310).

At 570, migration manager 350 may insert a mapping for the second set of memory pages in memory manager 375. For example, migration manager 350 may insert the mapping for the second set of memory pages in a memory table of memory manager 375. In some cases, migration manager 350 may generate the mapping and send the mapping to memory manager 375. Alternatively, migration manager 350 may instruct memory manager 375 to generate the mapping and to save the generated mapping to the mapping table of memory manager 375.

At 575, memory manager 375 may save the mapping to the mapping table. In some examples, memory manager 375 may save the mapping table in a buffer of memory manager 375 (e.g., a translation lookaside buffer of memory manager 375).

At 580, memory manager 375 may communicate a notification regarding the second set of memory pages to storage 370. For example, memory manager 375 may notify storage 370 that the second set of memory pages have been transferred.

At 585, storage 370 may communicate a request to memory manager 375. For example, storage 370 may request an address translation for the second set of memory pages. Based on the migration manager 350 transferring the second set of memory pages, the address translation may be provided without an error or fault.

At 590, memory manager 375 may provide storage 370 the address translation of the second set of memory pages. In some examples, workload 345 may provide an address translation from a virtual address to a physical address, enabling storage 370 to access the physical location of the memory pages. In some cases, storage 370 may write data associated with the second set of memory pages to storage 370.

At 595, storage 370 may request data to store. For example, storage 370 may request from workload 345 data to store at storage 370 based on the address translation of the second set of memory pages.

At 597, workload 345 may transfer the requested data. For example, workload 345 may transfer the data from a memory of workload 345 to storage 370 (e.g., based on a write command associated with the second set of memory pages; based on un-pausing or resuming a write command associated with the second set of memory pages).

Figure 6:
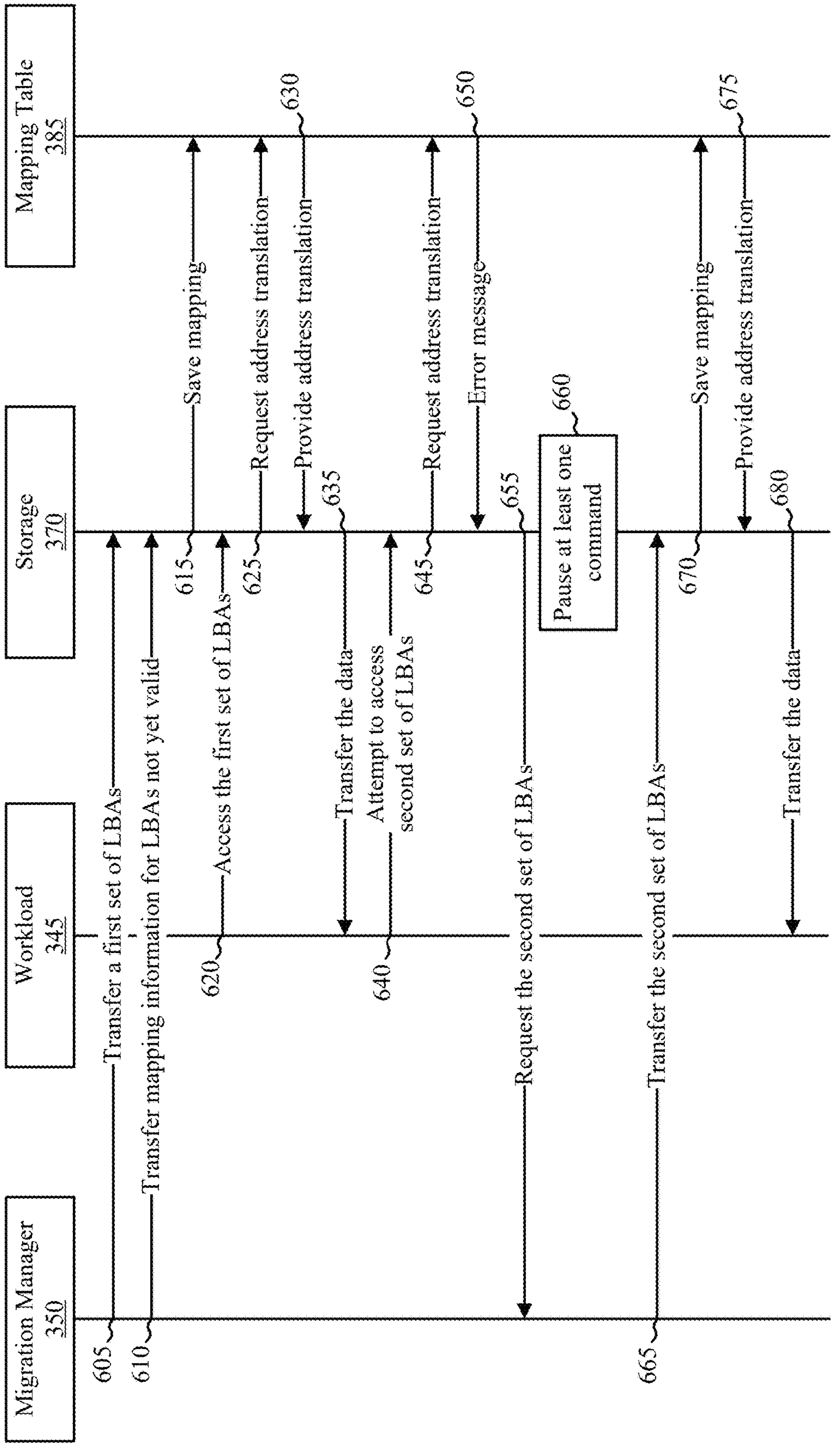
FIG. 6 depicts a flow diagram illustrating an example method associated with the disclosed systems, in accordance with example implementations described herein.

FIG. 6 depicts a flow diagram illustrating an example method 600 associated with the disclosed systems, in accordance with example implementations described herein. In some configurations, one or more aspects of method 600 may be implemented by or in conjunction with migration manager 140 of FIG. 1 and/or migration manager 230 of FIG. 2. In some configurations, one or more aspects of method 600 may be implemented by or in conjunction with machine 105, components of machine 105, or any combination thereof. The depicted method 600 is just one implementation and one or more operations of method 600 may be rearranged, reordered, omitted, and/or otherwise modified such that other implementations are possible and contemplated. It is noted that at least a portion of the operations of method 500 may be incorporated in method 600. Additionally, or alternatively, at least a portion of the operations of method 600 may be incorporated in method 500.

At 605, migration manager 350 may transfer a first set of logical block addresses (e.g., data of the first set of logical block addresses (LBAs)) to storage 370. For example, hypervisor may transfer a first set of LBAs from a storage of a source device (e.g., storage 340) to storage 370. The LBAs of the source device may be mapped to a portion of physical storage of the source device (e.g., storage 340), while the LBAs of the destination device may be mapped to a portion of physical storage on the destination device (e.g., storage 370). It is noted that at 605, there may be multiple transfers of the same LBA repeatedly (e.g., an iterative copy where the LBA keeps getting dirtied by the source workload).

At 610, migration manager 350 may transfer mapping information for LBAs not yet valid. For example, migration manager 350 may transfer to storage 370 (e.g., mapping table 385 of storage 370) mapping information for those LBAs that are determined to be not yet valid. In some cases, the transfer of mapping information at 610 may include calling out some of LBAs already copied as invalid. (e.g., source workload dirties the LBA later, and a new copy is used to get the most recent data rather than the stale data copied before).

At 615, storage 370 may save the mapping of the first set of LBAs to mapping table 385. In some cases, storage 370 may save mapping table 385 on a storage medium of storage 370 (e.g., NAND flash). In some cases, storage 370 may save mapping table 385 on a cache or memory chip of storage 370.

At 620, workload 345 may access the first set of LBAs. For example, based on the migration manager 350 transferring the first set of LBAs, workload 345 may access or request access to the first set of LBAs.

At 625, storage 370 may send a request to mapping table 385. For example, storage 370 may request an address translation based on the first set of LBAs.

At 630, mapping table 385 may provide storage 370 an address translation of the first set of LBAs. In some examples, mapping table 385 may provide an address translation from a logical address (e.g., LBA) to a physical address of storage 370, enabling storage 370 to access the physical location of the first set of LBAs. In some cases, storage 370 may provide the data at the physical location to workload 345.

At 635, storage 370 may transfer data to workload 345. For example, based on the address translation of the first set of LBAs, storage 370 may transfer data to workload 345 (e.g., based on a read command associated with the first set of LBAs). In some cases, the saving of the mapping at 615 may be based on a first command. The transferring of data at 635 may be based on the returning of data for the first command.

At 640, workload 345 may attempt to access a second set of LBAs. For example, storage 370 may receive a request (e.g., from a host, operating system, workload 345, etc.) to access the second set of LBAs.

At 645, storage 370 may send a request to mapping table 385. For example, storage 370 may request an address translation based on the second set of LBAs.

At 650, mapping table 385 may send a message to storage 370. For example, mapping table 385 may send a message to storage 370 based on the attempt to access the second set of LBAs. In the depicted example, the message may be an error message. In some cases, the message may indicate that the second set of LBAs are unavailable (e.g., not yet transferred from the source device).

At 655, storage 370 may communicate a request to migration manager 350. For example, storage 370 may request that the migration manager 350 transfer the second set of LBAs (e.g., data of the second set of LBAs) from the source device to the destination device (e.g., to storage 370).

At 660, storage 370 may pause at least one command associated with the second set of LBAs. For example, workload 345 may attempt to access the second set of LBAs based on one or more commands executing or to be executed by storage 370. In some cases, workload 345 may attempt to access the second set of LBAs based on at least one of a write command, a read command, an allocation command, etc. Accordingly, storage 370 may pause at least one of a write command, a read command, an allocation command, etc. In some cases, storage 370 may pause a read command associated with the second set of LBAs.

At 665, migration manager 350 may transfer the second set of LBAs. In some examples, migration manager 350 may transfer the second set of LBAs based on migration manager 350 requesting that a source device (e.g., source device 305) transfer the second set of LBAs to a destination device (e.g., destination device 310).

At 670, storage 370 may save the mapping of the second set of LBAs to mapping table 385. For example, storage 370 may update mapping table 385 to indicate a mapping of the second set of LBAs to physical blocks of storage 370 that hold the data transferred from the source device to the destination device.

At 675, mapping table 385 may provide storage 370 the address translation of the second set of LBAs. In some examples, mapping table 385 may provide an address translation from a logical address to a physical address, enabling storage 370 to access the physical location corresponding to the second set of LBAs. In some cases, storage 370 may read data associated with the second set of LBAs from the physical location and provide the data to workload 345.

At 680, storage 370 may transfer data to workload 345. For example, based on the address translation of the second set of LBAs, storage 370 may transfer data to workload 345 (e.g., based on a read command associated with the second set of LBAs; based on un-pausing or resuming a read command associated with the second set of LBAs). In some cases, the attempt to access the second set of LBAs at 640 may be based on a second command. The transferring of data at 650 may be based on the returning of data for the second command (e.g., based on resuming the second command after the second command is paused at 660).

Figure 7:
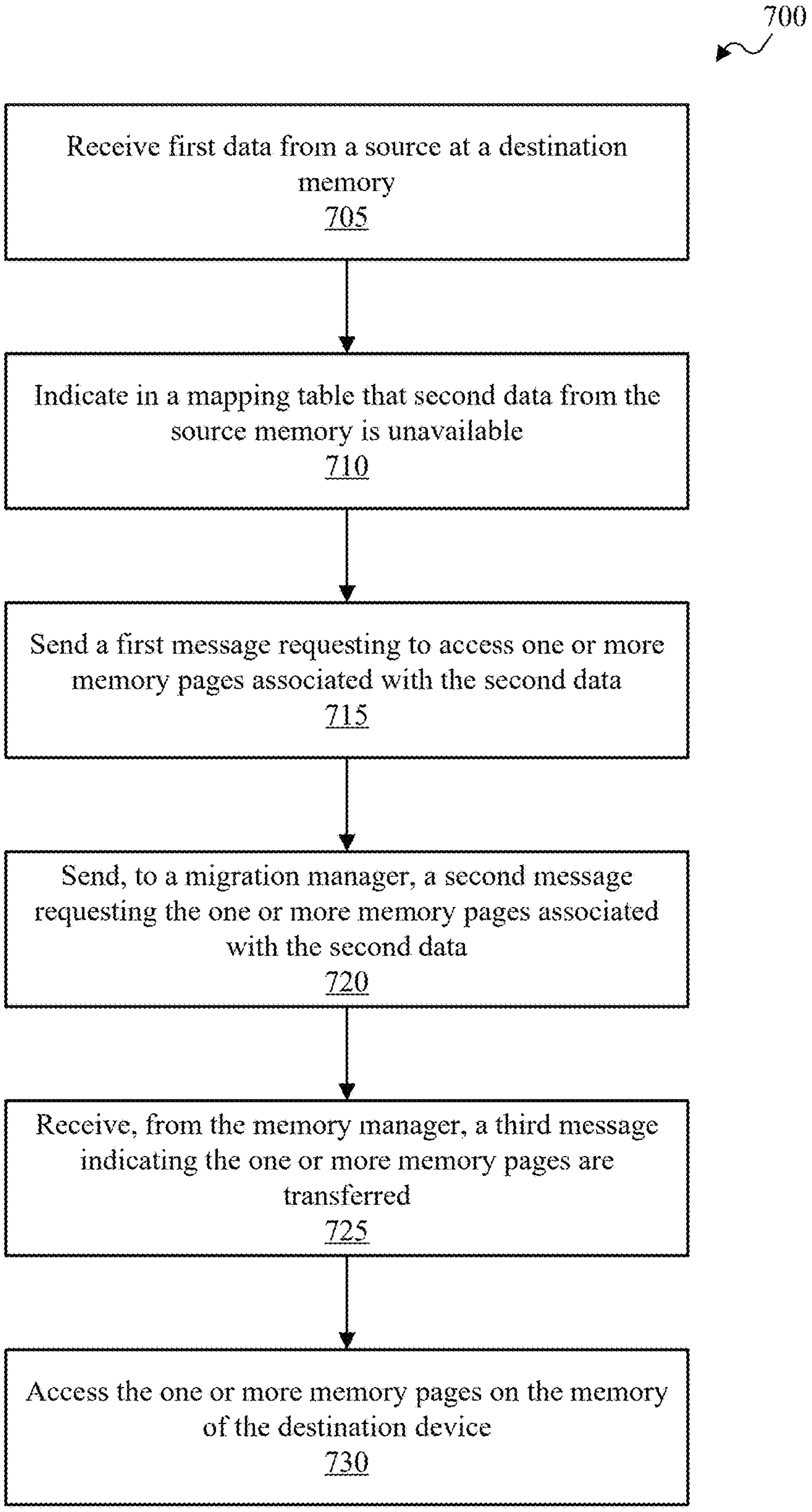
FIG. 7 depicts a flow diagram illustrating an example method associated with the disclosed systems, in accordance with example implementations described herein.

FIG. 7 depicts a flow diagram illustrating an example method 700 associated with the disclosed systems, in accordance with example implementations described herein. In some configurations, one or more aspects of method 700 may be implemented by or in conjunction with migration manager 140 of FIG. 1 and/or migration manager 230 of FIG. 2. In some configurations, one or more aspects of method 700 may be implemented by or in conjunction with machine 105, components of machine 105, or any combination thereof. The depicted method 700 is just one implementation and one or more operations of method 700 may be rearranged, reordered, omitted, and/or otherwise modified such that other implementations are possible and contemplated.

At 705, method 700 may include receiving, at a destination memory, first data from a source. For example, method 700 may include receiving, at a memory of a destination device, first data from a memory of a source device.

At 710, method 700 may include indicating in a mapping table that second data from the source memory is unavailable. For example, method 700 may include indicating in a mapping table of a memory manager that second data from the memory of the source device is unavailable on the memory of the destination device. For instance, an indicator in the mapping table may indicate that the transfer of the second data to the destination may be pending (e.g., not yet transferred to destination). Additionally, or alternatively, the second data may be missing from the mapping table, where the second data not being included in the mapping table indicates that the second data is unavailable at the destination.

At 715, method 700 may include sending, to the memory manager, a first message requesting to access on the memory of the destination device one or more memory pages associated with the second data. For example, method 700 may include sending, from a storage drive to the memory manager, a first message requesting to access on the memory of the destination device one or more memory pages associated with the second data.

At 720, method 700 may include sending, to a hypervisor, a second message requesting the one or more memory pages associated with the second data. For example, method 700 may include sending, from the memory manager to a hypervisor of the destination device, a second message requesting the one or more memory pages associated with the second data be copied from the memory of the source device to the memory of the destination device.

At 725, method 700 may include receiving, from the memory manager, a third message indicating the one or more memory pages are transferred. For example, method 700 may include receiving, at the storage drive from the memory manager, a third message indicating the one or more memory pages are copied from the memory of the source device to the memory of the destination device.

At 730, method 700 may include accessing the one or more memory pages on the memory of the destination device. For example, method 700 may include accessing, by the storage drive, the one or more memory pages on the memory of the destination device.

Figure 8:
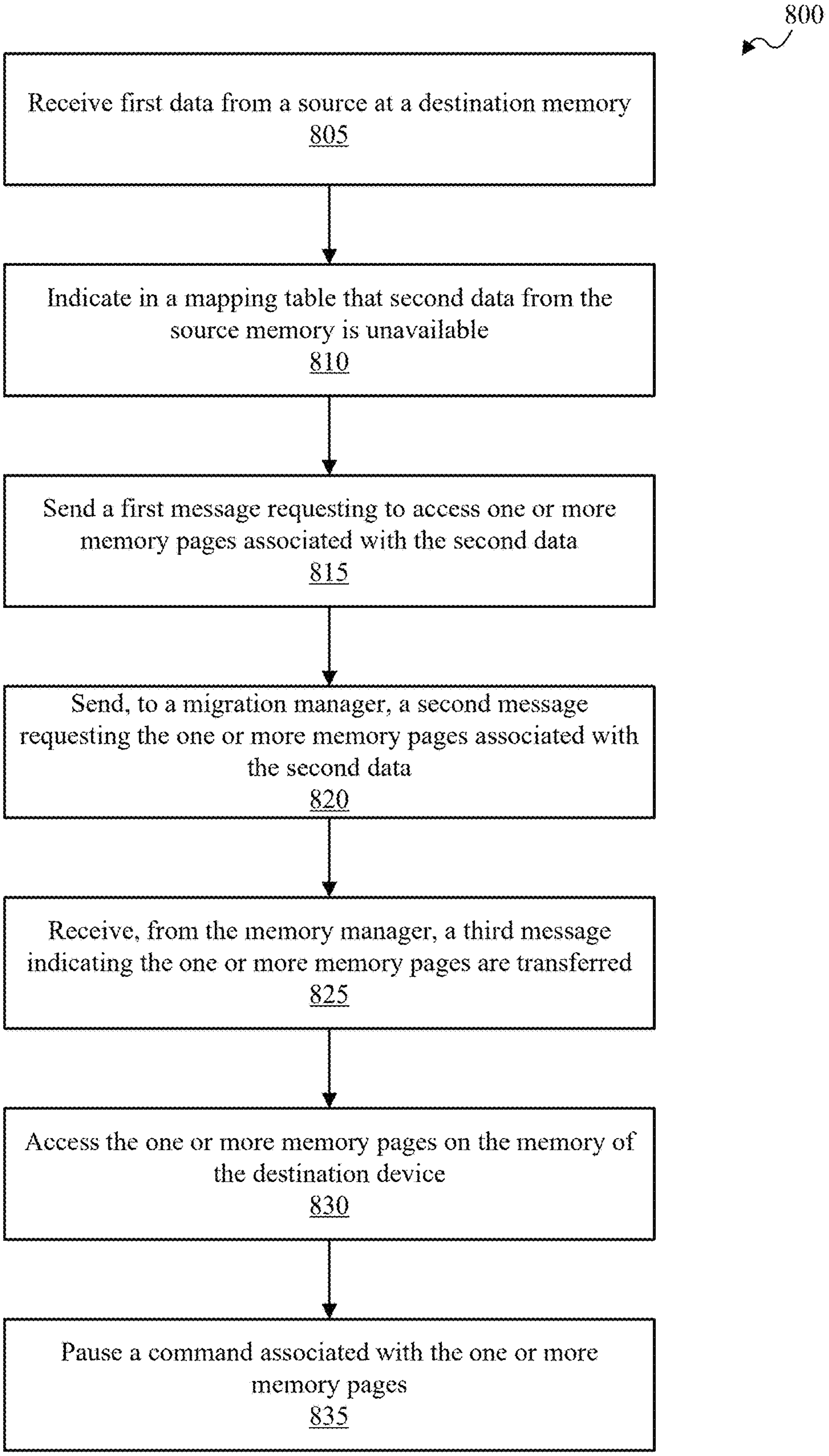
FIG. 8 depicts a flow diagram illustrating an example method associated with the disclosed systems, in accordance with example implementations described herein.

FIG. 8 depicts a flow diagram illustrating an example method 800 associated with the disclosed systems, in accordance with example implementations described herein. In some configurations, one or more aspects of method 800 may be implemented by or in conjunction with migration manager 140 of FIG. 1 and/or migration manager 230 of FIG. 2. In some configurations, one or more aspects of method 800 may be implemented by or in conjunction with machine 105, components of machine 105, or any combination thereof. The depicted method 800 is just one implementation and one or more operations of method 800 may be rearranged, reordered, omitted, and/or otherwise modified such that other implementations are possible and contemplated.

At 805, method 800 may include receiving, at a destination memory, first data from a source. For example, method 800 may include receiving, at a memory of a destination device, first data from a memory of a source device.

At 810, method 800 may include indicating in a mapping table that second data from the source memory is unavailable. For example, method 800 may include indicating in a mapping table of a memory manager that second data from the memory of the source device is unavailable on the memory of the destination device. For instance, the transfer of the second data to the destination may be pending (e.g., not yet transferred to destination). Additionally, or alternatively, the second data may be missing from the mapping table, and the that, where the second data not being included in the mapping table indicates that the second data is unavailable at the destination At 815, method 800 may include sending, to the memory manager, a first message requesting to access on the memory of the destination device one or more memory pages associated with the second data. For example, method 800 may include sending, from a storage drive to the memory manager, a first message requesting to access on the memory of the destination device one or more memory pages associated with the second data.

At 820, method 800 may include sending, to a hypervisor, a second message requesting the one or more memory pages associated with the second data. For example, method 800 may include sending, from the memory manager to a hypervisor of the destination device, a second message requesting the one or more memory pages associated with the second data be copied from the memory of the source device to the memory of the destination device.

At 825, method 800 may include receiving, from the memory manager, a third message indicating the one or more memory pages are transferred. For example, method 800 may include receiving, at the storage drive from the memory manager, a third message indicating the one or more memory pages are copied from the memory of the source device to the memory of the destination device.

At 830, method 800 may include accessing the one or more memory pages on the memory of the destination device. For example, method 800 may include accessing, by the storage drive, the one or more memory pages on the memory of the destination device.

At 835, method 800 may include pausing a command associated with the one or more memory pages. For example, method 800 may include the storage drive pausing a command associated with the one or more memory pages based on the storage drive receiving an error message from the memory manager indicating the one or more memory pages are unavailable on the memory of the destination device.

In the examples described herein, the configurations and operations are example configurations and operations, and may involve various additional configurations and operations not explicitly illustrated. In some examples, one or more aspects of the illustrated configurations and/or operations may be omitted. In some embodiments, one or more of the operations may be performed by components other than those illustrated herein. Additionally, or alternatively, the sequential and/or temporal order of the operations may be varied.

Certain embodiments may be implemented in one or a combination of hardware, firmware, and software. Other embodiments may be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wired and/or wireless communication device such as a switch, router, network interface controller, cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be wireless, wired, mobile, and/or stationary.

As used within this document, the term "communicate" is intended to include transmitting, or receiving, or both transmitting and receiving. Similarly, the bidirectional exchange of data between two devices (both devices transmit and receive during the exchange) may be described as "communicating", when only the functionality of one of those devices is being claimed. The term "communicating" as used herein with respect to wired and/or wireless communication signals includes transmitting the wired and/or wireless communication signals and/or receiving the wired and/or wireless communication signals. For example, a communication unit, which is capable of communicating wired and/or wireless communication signals, may include a wired/wireless transmitter to transmit communication signals to at least one other communication unit, and/or a wired/wireless communication receiver to receive the communication signal from at least one other communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other examples as set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method of live migration comprising:

receiving, at a memory of a destination device, first data from a memory of a source device;

indicating in a mapping table of a memory manager that second data from the memory of the source device is unavailable in the memory of the destination device;

sending, from a storage drive to the memory manager, a first message requesting to access, on the memory of the destination device, one or more memory pages associated with the second data;

sending, from the memory manager to a migration manager of the destination device, a second message requesting the one or more memory pages associated with the second data be copied from the memory of the source device to the memory of the destination device;

receiving, at the storage drive from the memory manager, a third message indicating the one or more memory pages are copied from the memory of the source device to the memory of the destination device; and accessing, by the storage drive, the one or more memory pages on the memory of the destination device.

2. The method of claim 1, wherein the storage drive pauses a command associated with the one or more memory pages based on the storage drive receiving an error message from the memory manager indicating the one or more memory pages are unavailable on the memory of the destination device.

3. The method of claim 2, wherein the command comprises at least one of a write command, a read command, or an allocation command.

4. The method of claim 1, wherein the migration manager requests, based on the second message, that the one or more memory pages be copied from the memory of the source device to the memory of the destination device.

5. The method of claim 1, wherein the third message is based on the migration manager communicating to the memory manager that the one or more memory pages are copied from the memory of the source device to the memory of the destination device.

6. The method of claim 1, wherein the memory manager updates the mapping table to indicate the one or more memory pages associated with the second data are available on the memory of the destination device.

7. The method of claim 1, wherein the storage drive and the memory manager are located on the destination device.

8. The method of claim 1, wherein:

the memory manager is included in a processor of the destination device, and the mapping table is stored in the memory manager.

9. The method of claim 1, wherein the storage drive writes data corresponding to the one or more memory pages to at least one logical block address (LBA) of the storage drive.

10. A method of live migration comprising:

receiving, at a destination storage drive of a destination device, first data from a source storage drive of a source device;

indicating in a mapping table of the destination storage drive that second data from the source storage drive is unavailable in the destination storage drive;

receiving, at the destination storage drive from a host of the destination device, a first message requesting to access on the destination storage drive one or more logical block addresses (LBAs) associated with the second data;

sending, from the destination storage drive to a migration manager of the destination device, a second message requesting the one or more LBAs associated with the second data be copied from the source storage drive to the destination storage drive;

receiving, at the storage drive from the migration manager, a third message indicating the one or more LBAs are copied from the source storage drive to the destination storage drive; and providing, by the destination storage drive, data associated with the one or more LBAs to the host of the destination device.

11. The method of claim 10, wherein the destination storage drive pauses a command associated with the one or more LBAs based on the mapping table of the storage drive indicating the one or more LBAs are unavailable on the destination storage drive.

12. The method of claim 11, wherein the command comprises at least one of a write command, a read command, or an allocation command.

13. The method of claim 10, wherein the migration manager requests, based on the second message, that the one or more LBAs be copied from the source storage drive to the destination storage drive.

14. The method of claim 10, wherein the third message is based on the migration manager communicating to the destination storage drive that the one or more LBAs are copied from the source storage drive to the destination storage drive.

15. The method of claim 10, wherein the destination storage drive updates the mapping table to indicate the one or more LBAs associated with the second data are available on the destination storage drive.

16. The method of claim 10, wherein the mapping table is stored in the destination storage drive.

17. The method of claim 10, wherein the storage drive comprises a peripheral component interconnect express (PCIe) solid state drive (SSD) or a non-volatile memory express (NVMe) SSD.

18. A non-transitory computer-readable medium storing code that comprises instructions executable by one or more processors to:

receive first data from memory of a source device;

indicate in a mapping table of a memory manager that second data from the memory of the source device is unavailable in a memory of destination device;

send, to the memory manager, a first message requesting to access, on the memory of the destination device, one or more memory pages associated with the second data;

send, to a migration manager of the destination device, a second message requesting the one or more memory pages associated with the second data be copied from the memory of the source device to the memory of the destination device;

receive, from the memory manager, a third message indicating the one or more memory pages are copied from the memory of the source device to the memory of the destination device; and access the one or more memory pages on the memory of the destination device.

19. The non-transitory computer-readable medium of claim 18, wherein the code includes further instructions executable by the processor to pause a command associated with the one or more memory pages based on receiving an error message from the memory manager indicating the one or more memory pages are unavailable on the memory of the destination device.

20. The non-transitory computer-readable medium of claim 19, wherein the command comprises at least one of a write command, a read command, or an allocation command.

* * * * *